United States Patent
Senninger et al.

(10) Patent No.: US 6,509,428 B1
(45) Date of Patent: *Jan. 21, 2003

(54) RADICAL POLYMERIZATION IN THE PRESENCE OF SEVERAL STABLE FREE RADICALS

(75) Inventors: Thierry Senninger, Hayange (FR); Sophie Robin, Talence (FR); Yves Gnanou, Talence (FR)

(73) Assignee: Atofina, Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/413,755

(22) Filed: Oct. 6, 1999

(30) Foreign Application Priority Data

Oct. 6, 1998 (FR) .............................. 98 12477

(51) Int. Cl.$^7$ .................................................. C08F 2/00
(52) U.S. Cl. ................. 526/220; 526/219.2; 526/317.1; 526/328; 526/329.2; 526/346; 526/347
(58) Field of Search ............................. 526/220, 219.2, 526/317, 328, 329.2, 346, 347

(56) References Cited

U.S. PATENT DOCUMENTS

| | | | |
|---|---|---|---|
| 4,581,429 A | 4/1986 | Solomon et al. |
| 5,616,638 A | 4/1997 | Hallden-Abberton et al. |
| 5,721,320 A | 2/1998 | Priddy et al. |
| 5,723,511 A | 3/1998 | Kazmaier et al. |
| 5,744,560 A | 4/1998 | Foucher et al. |

FOREIGN PATENT DOCUMENTS

| | | |
|---|---|---|
| CA | 2168820 | 8/1996 |
| CA | 217666 | 9/1996 |
| CA | 2219729 | 5/1998 |
| EP | 0 467 850 | 9/1995 |
| EP | 0814097 | 12/1997 |
| EP | 0826697 | 3/1998 |
| EP | 0832902 | 4/1998 |
| EP | 0844256 | 5/1998 |
| EP | 0 906 937 | 4/1999 |
| EP | 0 735 052 | 6/1999 |
| WO | 98/30601 | 7/1998 |

OTHER PUBLICATIONS

English Text of Ser. No. 08/974,097.
English Text of Ser. No. 08/687,543.
English Text of Ser. No. 09/275,367.
English Text of Ser. No. 09/164,717.
Characteristics of the Stable Free Radical Polymerization of Styrene in the Presence of 2–Fluoro–1–methylpyridinium ρ–Toluenesulfonate, Peter G. Odell et al., Macromolecules 1997, vol. 30, pp. 2232–2237.
Narrow Polydispersity Polystyrene by a Free–Radical Polymerization Process—Rate Enhancement, Michael K. Georges et al., Macromolecules 1994, vol. 27, pp. 7228–7229.
Development of a New Class of Rate–Accelerating Additives for Nitroxide–Mediated 'Living'Free Radical Polymerization, Eva Malmström et al., Tetrahedron, vol. 53, No. 45, pp. 15225–15236, 1997.
Radical Crossover in Nitroxide Mediated "Living" Free Radical Polymerizations, Craig J. Hawker et al., J. Am. Chem. Soc. 1996, vol. 118, pp. 11467–11471.
French Search Report dated May 10, 1999.
Alkoxyamine–Initiated Living Radical Polymerization: Factors Affecting Alkoxyamine Homolysis Rates, Graeme Moad et al., Macromolecules 1995, vol. 28, No. 26, pp. 8722–8728.

*Primary Examiner*—Helen L. Pezzuto
(74) *Attorney, Agent, or Firm*—Millen, White, Zelano & Branigan, P.C.

(57) ABSTRACT

The invention relates to a process for the radical polymerization of at least one monomer in the presence of at least two stable free radicals of different natures. The use of two different stable free radicals is reflected by a higher productivity than that which would be expected on calculating the arithmetic mean of the productivities obtained with each of the stable free radicals when they are used individually.

25 Claims, No Drawings

RADICAL POLYMERIZATION IN THE PRESENCE OF SEVERAL STABLE FREE RADICALS

FIELD OF THE INVENTION

The invention relates to a process for radical polymerization in the presence of several stable free radicals.

BACKGROUND OF THE INVENTION

Radical polymerization in the presence of a stable free radical results in a polymer of narrow polydispersity and makes possible the preparation of block polymers by a living polymerization mechanism.

The presence of a stable free radical during a polymerization is generally reflected, however, by a slowing down of the rate of polymerization.

The scale of this slowing down depends on the nature of the stable free radical.

Some stable free radicals have a lesser effect in slowing down the polymerization but, on the other hand, provide poorer control of the said polymerization and/or are expensive and/or decompose during the polymerization. It is therefore useful to have access to systems for controlled radical polymerization which is simultaneously fast, inexpensive and well-controlled by the stable free radical for as long as possible during the polymerization.

A radical polymerization becomes better controlled by virtue of the presence of a stable free radical in proportion as the curve representing the change in the number-average molecular mass as a function of the conversion of monomer to polymer approaches linearity. It is by virtue of the fact that a radical polymerization process is controlled by a stable free radical that the said process makes possible the preparation of sequential (that is to say, block) polymers by successive introduction of different monomers into the polymerization medium.

It will be recalled that the notion of a stable free radical is known to a person skilled in the art to denote a radical which is so persistent and unreactive with respect to air and moisture in the surrounding air that the pure radical can be handled and stored without more precautions at room temperature than are the majority of commercial chemicals (see, in this respect, D. Griller and K. Ingold, Accounts of Chemical Research, 1976, 9, 13–19, or Organic Chemistry of Stable Free Radicals, A. Forrester et al., Academic Press, 1968).

Definition of Stable Free Radical

A stable free radical must not be confused with free radicals with a transitory life time (a few milliseconds), such as the free radicals resulting from the usual polymerization initiators, such as peroxides, hydroperoxides and initiators of azo type. Polymerization initiator free radicals tend to accelerate the polymerization. In contrast, stable free radicals generally tend to slow down the polymerization. It can generally be said that a free radical is stable within the meaning of the present invention if it is not a polymerization initiator and if, under the conditions of use of the present invention, the mean lifetime of the radical is at least five minutes. During this mean lifetime, the molecules of the stable free radical continuously alternate the radical state and the state of a group bonded via a covalent bond to a polymer chain. Of course, it is preferable for the stable free radical to exhibit good stability throughout the duration of its use in the context of the present invention. A stable free radical c an generally be isolated in the radical state at room temperature. A stable free radical is sufficiently stable for its free radical state to be able to be characterized by spectoscopic methods.

Mechanism of Stable Free Radical

The stable free radical forms, during the polymerization, a reversible bond with the growing polymer chain. The stable free radical continuously alternates, at the end of the polymer chain, the state of a group bonded via a covalent bond to the said chain and the state of a stable free radical detached from the said chain in order to allow the insertion of a monomer unit, according to the following process,

in which —M represents a monomer unit of the growing chain, M represents a monomer unit and Y˙ represents the stable free radical, for the case where the latter is monofunctional, that is to say that its molecule only carries a single site exhibiting the radical state. This process is repeated in order for the polymer chain to grow by insertion of monomer between the growing chain and the stable free radical.

In the case where a radical polymerization initiator has been introduced into the polymerization medium, another means for describing the degree of control of the polymerization is to compare the number-average molecular mass observed (experimental Mn) with the theoretical number-average molecular mass (theoretical Mn), such as is calculated by the equation:

$$\text{Theoretical } Mn = \frac{(M) \times C \times Mo}{F_{INI}(INI)}$$

in which (M) represents the number of moles of monomer,

C represents the conversion of the monomer to polymer (which can range from 0 for no conversion to 1 for total conversion) equal to the ratio:

$$\frac{\text{mass of polymer formed}}{\text{remaining mass of monomer} + \text{mass of polymer formed}}$$

$F_{INI}$ represents the functionality of the initiator, that is to say the number of sites exhibiting the free radical state which each initiator molecule is capable of generating, (INI) represents the number of moles of initiator, Mo represents the molar mass of the monomer.

The control of the polymerization becomes better in proportion as experimental Mn becomes closer to theoretical Mn.

Mention may be made, as an example of an initiator for which the functionality $F_{IN}$, is 2, of dicumyl peroxide.

Mention may be made, as an example of an initiator for which the functionality $F_{INI}$ is 4, of ethyl 3,3-di(tert-amylperoxy)butyrate, which can be represented by:

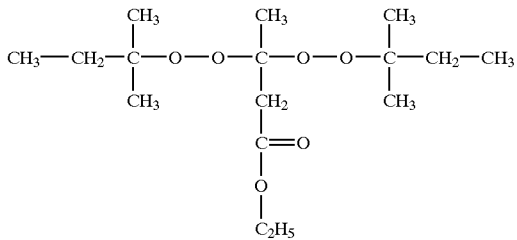

as it comprises two —O—O— linkages each capable of generating two sites exhibiting the free radical state, namely —O·.

SUMMARY OF THE INVENTION

The invention responds to the abovementioned problems. The invention relates to a process for the radical polymerization of at least one monomer in the presence of at least two stable free radicals of different natures. The two stable free radicals are chosen so that they exhibit different equilibrium constants, taking into account the polymer to be polymerized and the polymerization temperature.

This equilibrium constant of a stable free radical with respect to a monomer characterizes the equilibrium of the reaction:

$$(-M)_{F_Y}-Y \rightleftharpoons F_Y(-M^·)+Y^{F_Y·}$$

in which

M represents a monomer unit, which is bonded to another monomer unit or to an initiator residue, M· represents a monomer unit in radical form, $Y^{F_Y·}$ represents the stable free radical for which the functionality is equal to $F_Y$, which means that the stable free radical molecule exhibits a number of sites exhibiting the radical state equal to $F_Y$, Y represents the group resulting from the stable free radical when the latter is connected to as many monomer units as its functionality, for this reason making it lose its radical state.

For a given monomer and a given polymerization temperature, at least two of the stable free radicals preferably exhibit equilibrium constants such that their ratio is greater than 5, more preferably greater than 10 and more preferably greater than 100.

Mention may be made, as an example of a stable free radical for which the functionality is equal to 1, of a molecule represented by:

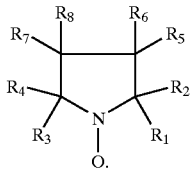

the $R_1$, $R_2$, $R_3$, $R_4$, $R_5$, $R_6$, $R_7$ and $R_8$ groups of which represent alkyl radicals.

Mention may be made, as an example of a stable free radical for which the functionality is equal to 2, of a molecule represented by:

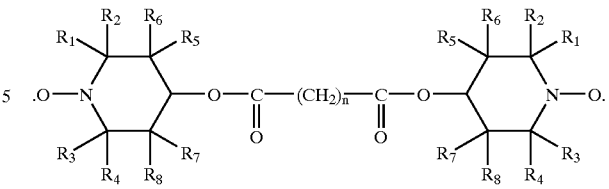

the $R_1$, $R_2$, $R_3$, $R_4$, $R_5$, $R_6$, $R_7$ and $R_8$ groups of which represent alkyl radicals and n of which represents a non-zero integer, for example ranging from 1 to 20.

The equilibrium constant K is such that $$K = \frac{[-M^·] \times [Y^{F_Y·}]}{[(-M)_{F_Y}-Y]}$$

in which:

[—M·] represents the concentration of species carrying at least one monomer unit in radical form, $[Y^{F_Y·}]$ represents the concentration of stable free radical, $[(-M)_{F_Y}-Y]$ represents the concentration of species carrying the $(-M)_{F_Y}-Y$ linkage in which the stable free radical is carried in a form bonded by as many covalent bonds as its functionality to as many monomer units as its functionality.

Thus, when the stable free radical is monofunctional ($F_Y=1$), the equilibrium constant $$K = \frac{[-M^·] \times [Y^·]}{[-M-Y]}$$

characterizes the equilibrium $$-M-Y \rightleftharpoons -M^·+Y^·$$

Y· representing the monofunctional stable free radical.

Thus, when the stable free radical is bifunctional ($F_Y=2$), the equilibrium constant $$K = \frac{[-M^·] \times [Y^{2·}]}{[-M-Y-M-]}$$

characterizes the equilibrium $$-M-Y-M- \rightleftharpoons 2-M^·+Y^{2·}$$

$Y^{2·}$ representing the bifunctional stable free radical.

The rate of polymerization decreases as the equilibrium constants of the monomer/stable free radical pair decreases, for a given monomer.

It has been found that the use of a mixture of stable free radicals exhibiting different equilibrium constants is reflected by a higher productivity than that which would be expected on calculating the arithmetic mean of the productivities obtained with each of the stable free radicals when they are used individually, under polymerization conditions, furthermore, which are identical.

The term "productivity" is understood to mean the amount of polymer obtained per hour of polymerization when the conversion of monomer to polymer is 0.95.

Thus, in the case of the use of two stable free radicals, the following relationship is observed:

$$P > xP_1+(1-x)nP_2$$

in which
P represents the productivity in the case of the use of two stable free radicals respectively present with the molar fractions x and 1−x,
$P_1$ represents the productivity in the case of the use of the first stable free radical alone, when it is at a concentration equal to the sum of the concentrations of the two stable free radicals,
$P_2$ represents the productivity in the case of the use of the second stable free radical alone, when it is at a concentration equal to the sum of the concentrations of the two stable free radicals.

It has been found that the use of a mixture of stable free radicals exhibiting different equilibrium constants is reflected by a higher rate of polymerization than that which would be expected on calculating the arithmetic mean of the rates of polymerization obtained with each of the stable free radicals when they are used individually. Thus, in the case of the use of two stable free radicals, the following relationship is observed during the polymerization corresponding to a conversion of greater than 0.5:

$$C > xC_1 + (1-x)C_2$$

in which
C represents the conversion of monomer to polymer in the case of the use of a mixture of two stable free radicals respectively present with molar fractions x and 1−x, the said conversion C being greater than 0.5,
$C_1$ represents the conversion of monomer to polymer in the case of the use of the first stable free radical alone, when it is at a concentration equal to the sum of the concentrations of the two stable free radicals,
$C_2$ represents the conversion of monomer to polymer in the case of the use of the second stable free radical alone, when it is at a concentration equal to the sum of the concentrations of the two stable free radicals.

The observation of the synergy resulting from the presence of two stable free radicals during the polymerization, the said observation being made on the basis of the conversions, involves the comparison of three polymerizations with the same duration of polymerization, under comparable polymerization conditions,
a first polymerization being carried out in the presence of two stable free radicals with a conversion of monomer to polymer of greater than 0.5, the sum of the number of moles of the two stable free radicals being equal to n,
a second polymerization being carried out in the presence of one of the two stable free radicals, the said stable free radical being present in the proportion of a number of moles n, the said second polymerization not necessarily exhibiting a conversion of greater than 0.5,
a third polymerization being carried out in the presence of the other of the two stable free radicals, the said stable free radical being present in the proportion of a number of moles n, the said third polymerization not necessarily exhibiting a conversion of greater than 0.5.

For the implementation of the present invention, the combination of at least two stable free radicals can, for example, be such that:
the first stable free radical greatly slows down the polymerization, is very stable thermally (slight decomposition during depolymerization) and is inexpensive,
a second stable free radical slows down the polymerization to a lesser extent, is less stable thermally and is more expensive.

The combination of two such stable free radicals results in a high rate of polymerization, despite the use of the stable free radical which theoretically has to greatly slow it down (on the basis of the calculation of the arithmetic mean of the conversions obtained with each of the stable free radicals when they are used individually), and provides good control of the polymerization, for a sufficient duration and a moderate cost.

The family of the stable free radicals includes in particular the compounds acting as radical polymerization inhibitors for the storage of monomers, stable nitroxyl radicals, that is to say comprising the =N—O• group. Use may be made, as stable free radical, of, for example, the radicals represented by the following formulae:

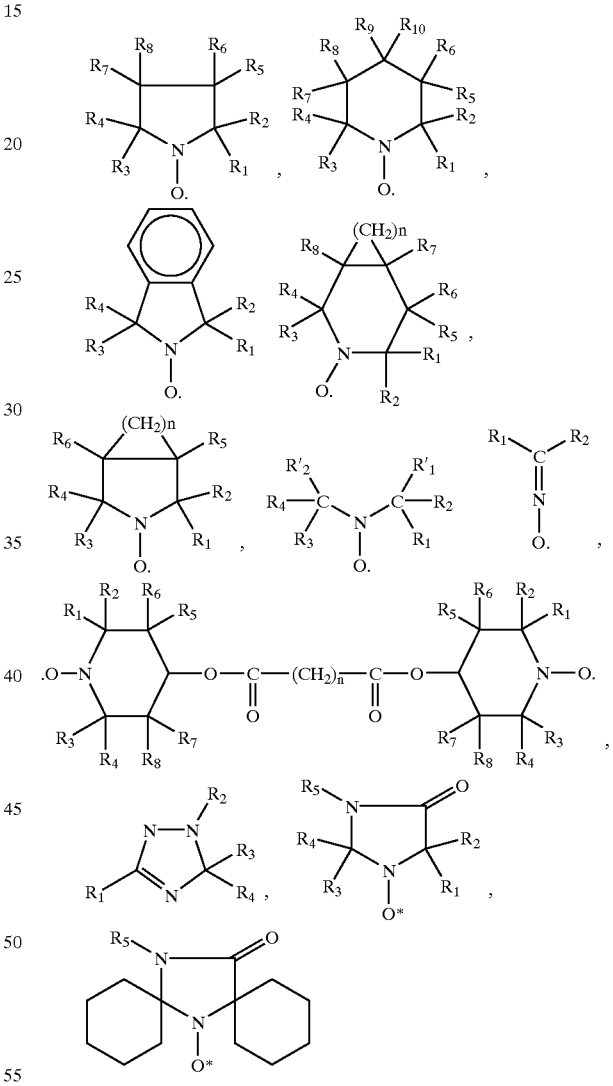

in which n represents a non-zero integer and $R_1$, $R_2$, $R_3$, $R_4$, $R'_1$ and $R'_2$, which can be identical or different, represent a hydrogen atom, a halogen atom, such as chlorine, bromine or iodine, a saturated or unsaturated, linear, branched or cyclic hydrocarbon-comprising group, such as an alkyl or phenyl radical, or a —COOR ester group or an —OR alkoxy group, or a —PO(OR)$_2$ phosphonate group, or a polymer chain which can, for example, be a poly(alkyl (meth) acrylate) chain, such as poly(methyl methacrylate), a polydiene chain, such as polybutadiene, or a polyolefin chain, such as polyethylene or polypropylene, but preferably being a polystyrene chain, and in which $R_5$, $R_6$, $R_7$, $R_8$, $R_9$ and $R_{10}$, which can be identical or different, can be chosen from the same family of groups as that which has just been envisaged for $R_1$, $R_2$, $R_3$, $R_4$, $R'_1$ and $R'_2$ and furthermore can represent an —OH hydroxide group or an acid group, such as —COOH or —PO(OH)$_2$ or —SO$_3$H.

In particular, use may be made, as stable free radical, of 2,2,5,5-tetramethyl-1-pyrrolidinyloxy, sold under the trade name Proxyl, 2,2,6,6-tetramethyl-1-piperidinyloxy, generally sold under the name Tempo, 4-hydroxy-2,2,6,6-tetramethyl-1-piperidinyloxy, sold under the name 4-hydroxy-Tempo, 4-methoxy-2,2,6,6-tetramethyl-1-piperidinyloxy, commonly known as 4-methoxy-Tempo, 4-oxo-2,2,6,6-tetramethyl-1-piperidinyloxy, commonly known as 4-oxo-Tempo, bis(1-oxyl-2,2,6,6-tetramethylpiperidin-4-yl) sebacate, sold under the trade name CXA 5415 by the company Ciba Speciality Chemicals, 2,2,6,6-tetramethyl-4-hydroxypiperidin-1-oxyl monophosphonate or 3-carboxy-2,2,5,5-tetramethyl-pyrrolidinyloxy (commonly known as 3-carboxy-Proxyl).

Use may also be made, as stable free radical, of those from the following list:
N-tert-butyl-1-phenyl-2-methylpropyl nitroxide
N-tert-butyl-1-(2-naphthyl)-2-methylpropyl nitroxide,
N-tert-butyl-1-diethylphosphono-2,2-dimethylpropyl nitroxide,
N-tert-butyl-1-dibenzylphosphono-2,2-dimethylpropyl nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphono-1-methylethyl nitroxide,
N-tert-butyl-1-di(2,2,2-trifluoroethyl)phosphono-2,2-dimethylpropyl nitroxide,
N-tert-butyl-1-diethylphosphono-2-methylpropyl nitroxide,
N-(1-methylethyl)-1-(diethylphosphono)cyclohexyl nitroxide,
N-(1-phenylbenzyl)-1-diethylphosphono-1-methylethyl nitroxide,
2,4,6-tri(tert-butyl)phenoxy.

In the context of the present invention, at least two of the stable free radicals can, for example, be such that:
the first exhibits, in its structure, the linkage

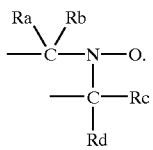

in which the Ra, Rb, Rc and Rd radicals, which can be identical or different, are either a hydrogen atom or a methyl radical,
the second exhibits, in its structure, the linkage

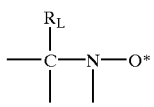

in which $R_L$ represents a monovalent radical with a molar mass of greater than 15. The $R_L$ radical can, for example, be chosen from the list provided for the choice of the $R_1R_2$, $R_3$, $R_4$, $R'_1$ and $R'_2$ radicals seen above, provided that they exhibit a molar mass of greater than 15.

In this combination of stable free radicals, $R_L$ preferably has a molar mass of greater than 30, for example ranging from 40 to 400.

At least two of the stable free radicals can therefore be such that:
the first is chosen from
2,2,6,6-tetramethyl-1-piperidinyloxy (commonly known as Tempo),
4-hydroxy-2,2,6,6-tetramethyl-1-piperidinyloxy (commonly known as 4-hydroxy-Tempo),
4-methoxy-2,2,6,6-tetramethyl-1-piperidinyloxy (commonly known as 4-methoxy-Tempo),
4-oxo-2,2,6,6-tetramethyl-1-piperidinyloxy (commonly known as 4-oxo-Tempo),
bis(1-oxyl-2,2,6,6-tetramethylpiperidin-4-yl) sebacate, which can be represented by the formula

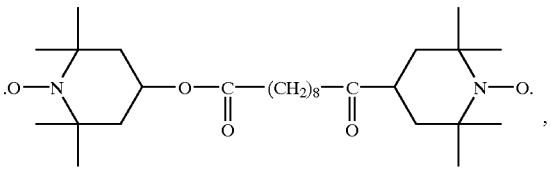

2,2,6,6-tetramethyl-4-hydroxypiperidin-1-oxyl monophosphonate,
3-carboxy-2,2,5,5-tetramethylpyrrolidinyloxy (commonly known as 3-carboxy-Proxyl), and,
the second is chosen from
N-tert-butyl-1-diethylphosphono-2,2-dimethylpropyl nitroxide,
N-tert-butyl-1-dibenzylphosphono-2,2-dimethylpropyl nitroxide,
N-tert-butyl-1-di(2,2,2-trifluoroethyl)phosphono-2,2-dimethylpropyl nitroxide,
N-tert-butyl-1-diethylphosphono-2-methylpropyl nitroxide,
N-(1-methylethyl)-1-(diethylphosphono)cyclohexyl nitroxide,
N-(1-phenylbenzyl)-1-diethylphosphono-1-methylethyl nitroxide.

The stable free radicals can be present so that, at the polymerization temperature:

$$\sum_{i=1}^{t} [F_{SFR}^i \times (SFR^i)]$$

ranges from $5 \times 10^{-7}$ to 0.5 mol per mole of monomer and preferably from $5 \times 10^{-6}$ to 0.5 mol per mole of monomer, $F_{SFR}^i$ representing the functionality of the ith stable free radical $SFR^i$, that is to say the number of sites on the same stable free radical molecule exhibiting the radical state, t representing the number of stable free radicals in the polymerization medium, and $(SFR^i)$ representing the number of moles of the ith stable free radical.

The amount $(SFR^i)$ takes into account all the species acting as the ith stable radical, that is to say the said stable free radical in the free form but also in the form bonded via a covalent bond within a molecule, the said molecule being capable of generating it under the conditions of use. Such a molecule is said to be the carrier of a group which generates a stable free radical. This is because each stable free radical can be introduced in the free form and/or in the form bonded via a covalent bond in a molecule, so that, during its use, the molecule releases the stable free radical. For example, for the case of a monofunctional stable free radical, the latter can be introduced in the form of a molecule comprising a group which generates a stable free radical which can be represented by —A–Y, so that, during the polymerization, this group cleaves to form —A˙+Y˙, Y˙ representing the monofunctional stable free radical. Of course, the —A–Y group does not itself exhibit the radical nature but it generates in situ a molecule exhibiting this nature.

At least two stable free radicals can be present in amounts such that the ratio $$\frac{F_{SFR}^1 \times (SFR^1)}{F_{SFR}^2 \times (SFR^2)}$$

ranges from 0.001 to 1000, and more preferably from 0.01 to 100,
in which
$F_{SRF}^1$ represents the functionality of a first stable free radical $SFR^1$,
($SFR^1$) represents the number of moles of the said first stable free radical,
$F_{SFR}^2$ represents the functionality of a second stable free radical $SFR^2$,
($SFR^2$) represents the number of moles of the said second stable free radical.

At least one radical polymerization initiator can be used to initiate the polymerization. Such an initiator can be introduced in an amount such that $F_{INI}$+(INI) ranges from $1\times10^{-5}$ to 0.1 and preferably from $1\times10^{-4}$ to 0.1 mol per mole of monomer, $F_{INI}$ and (INI) having the meanings given above.

The amounts of stable free radical and of initiator can be such that the ratio:

$$\frac{\sum_{i=1}^{t} F_{SFR}^i \times (SFR^i)}{\sum_{j=1}^{z} [F_{INI}^j \times (INI^j)]}$$

ranges from 0.05 to 5 and preferably from 0.5 to 2.5, $F_{INI}^j$ representing the functionality of the jth initiator $INI^j$ and ($INI^j$) representing the number of moles of the jth initiator per mole of monomer, for the case where t stable free radicals should be involved and for the case where z polymerization initiators should be involved, i, j, t and z being non-zero integers.

The initiator can be chosen from the radical polymerization initiators known for initiating the polymerization of the monomer which has to be polymerized.

The initiator is a radical polymerization initiator which can be chosen from diacyl peroxides, peroxyesters, dialkyl peroxides or peroxyacetals. The following are particularly suitable initiators:
tert-butylperoxy isopropyl carbonate,
tert-butylperoxy 2-ethylhexyl carbonate,
dicumyl peroxide,
di-tert-butyl peroxide,
1,1-bis(tert-butylperoxy)cyclohexane,
1,1-bis(tert-butylperoxy)-3,3,5-trimethyl-cyclohexane,
tert-butyl peroxyacetate,
tert-butyl cumyl peroxide,
tert-butyl perbenzoate,
tert-butyl per(2-ethylhexanoate),
2,2-bis(tert-butylperoxy)butane,
butyl 4,4-bis(tert-butylperoxy)valerate,
ethyl 3,3-bis(tert-butylperoxy)butyrate,
2,2-bis[4,4-di(tert-butylperoxy)cyclo-hexyl]propane.

The process according to the invention makes possible the preparation of block polymers. This is because the polymerization of a first monomer by the process according to the invention leads to a living polymer block. It is then possible to connect a block of another polymer to this first block by placing the first living polymer block in a medium for the polymerization of a second monomer. It is thus possible to prepare block copolymers, for example copolymers comprising one or more polystyrene blocks and one or more polybutadiene blocks or copolymers comprising one or more polystyrene blocks and one or more blocks of the (meth) acrylate type.

In practice, the blocks can be prepared following one another, in the same equipment. When the first monomer is consumed, so as to prepare the first block, it is sufficient to introduce the second monomer intended for the preparation of the second block, without stopping the stirring and without cooling or other interruption. Of course, the conditions for forming each of the blocks, such as the temperature of the polymerization medium, can be adjusted according to the nature of the monomers.

Of course, it is possible to join as many blocks to the living polymer as desired by placing the latter in a medium for the polymerization of a monomer from which it is desired to constitute a block.

Thus, the invention also relates to a process for the preparation of a block polymer comprising at least one stage according to the invention leading to a first living block, the said living block subsequently being placed in the presence of at least one other monomer from which it is desired to constitute a block joined to the first block, so as to form a living diblock, and so on, according to the number of blocks which it is desired to prepare.

Thus, the present application also relates to a process for the preparation of a diblock polymer, comprising a stage of polymerization of a first monomer in accordance with the invention, so as to obtain a first living block, followed by a stage during which the first living block is placed in the presence of a second monomer which is polymerized, so as to form a second block joined to the first block.

The present application therefore also relates to a process for the preparation of a triblock polymer comprising a stage of polymerization of a third monomer in the presence of the diblock polymer prepared in accordance with what has just been said, so as to form a third block joined to the diblock polymer.

By way of examples, the following block polymers can be prepared:
polystyrene-b-poly(methyl methacrylate),
polystyrene-b-polystyrenesulphonate,
polystyrene-b-polyacrylamide,
polystyrene-b-polymethacrylamide,
poly(methyl methacrylate)-b-poly(ethyl acrylate),
polystyrene-b-poly(butyl acrylate),
polybutadiene-b-poly(methyl methacrylate), polyisoprene-b-poly(styrene-co-acrylonitrile), polybutadiene-b-poly(styrene-co-acrylonitrile), poly(styrene-co-butyl acrylate)-b-poly(methyl methacrylate), polystyrene-b-poly(vinyl acetate), polystyrene-b-poly(2-ethylhexyl acrylate), polystyrene-b-poly(methyl methacrylate-co-hydroxyethyl acrylate), polystyrene-b-polybutadiene-b-poly(methyl methacrylate), polybutadiene-b-polystyrene-b-poly(methyl methacrylate), polystyrene-b-poly(butyl acrylate)-b-polystyrene, polystyrene-b-polybutadiene-b-polystyrene, polystyrene-b-polyisoprene-b-polystyrene, poly(perfluorooctyl acrylate)-b-poly(methyl methacrylate), poly(perfluorooctyl acrylate)-b-polystyrene, poly(perfluorooctyl acrylate)-b-poly(behenyl acrylate), poly(perfluorooctyl acrylate)-b-poly(stearyl methacrylate), poly(n-octyl acrylate)-b-poly(methyl methacrylate).

The term "monomer" is understood to mean any monomer which can be polymerized or copolymerized by the radical route. The term "monomer" covers the mixtures of several monomers.

The monomer can be chosen from vinyl, vinylidene, diene, olefinic and allylic monomers.

The term "vinyl monomers" is understood to mean (meth)acrylates, vinylaromatic monomers, vinyl esters, (meth)acrylonitrile, (meth)acrylamide and mono- and di(alkyl comprising 1 to 18 carbon atoms)(meth)acrylamides, and monoesters and diesters of maleicanhydride and of maleic acid.

The (meth)acrylates are in particular those of the formulae respectively:

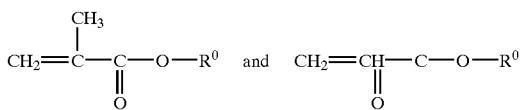

in which $R^0$ is chosen from linear or branched, primary, secondary or tertiary alkyl radicals comprising from 1 to 18 carbon atoms, cycloalkyl radicals comprising from 5 to 18 carbon atoms, alkoxyalkyl radicals in which the alkoxy part comprises 1 to 18 carbon atoms and the alkyl part comprises 1 to 18 carbon atoms, alkylthioalkyl radicals in which the alkylthio part comprises 1 to 18 carbon atoms and the alkyl part comprises 1 to 18 carbon atoms, aryl radicals and arylalkyl radicals, these radicals optionally being substituted by at least one halogen atom (such as fluorine) and/or at least one hydroxyl group, after protection of this hydroxyl group, the above alkyl groups being linear or branched; and glycidyl, norbornyl or isobornyl (meth)acrylates.

Mention may be made, as examples of useful methacrylates, of methyl, ethyl, 2,2,2-trifluoroethyl, n-propyl, isopropyl, n-butyl, sec-butyl, tert-butyl, n-amyl, i-amyl, n-hexyl, 2-ethylhexyl, cyclohexyl, octyl, i-octyl, nonyl, decyl, lauryl, stearyl, phenyl, benzyl, β-hydroxyethyl, isobornyl, hydroxypropyl or hydroxybutyl methacrylates.

Mention may be made, as examples of acrylates of the above formula, of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl, ethoxyethyl, perfluorooctyl or behenyl acrylates.

The term "vinylaromatic monomer" is understood to mean, within the meaning of the present invention, an aromatic monomer possessing ethylenic unsaturation, such as styrene, vinyltoluene, α-methylstyrene, 4-methylstyrene, 3-methylstyrene, 4-methoxystyrene, 2-(hydroxymethyl)styrene, 4-ethylstyrene, 4-ethoxystyrene, 3,4-dimethylstyrene, 2-chlorostyrene, 3-chlorostyrene, 4-chloro-3-methylstyrene, 3-(tert-butyl)styrene, 2,4-dichlorostyrene, 2,6-dichlorostyrene and 1-vinylnaphthalene.

Mention may be made, as vinyl esters, of vinyl acetate, vinyl propionate, vinyl chloride and vinyl fluoride.

Mention is made, as vinylidene monomer, of vinylidene fluoride.

The term "diene monomer" is understood to mean a diene chosen from conjugated or non-conjugated, linear or cyclic dienes, such as, for example, butadiene, 2,3-dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, the 2-alkyl-2,5-norbornadienes, 5-ethylene-2-norbornene, S-(2-propenyl)-2-norbornene, 5-(5-hexenyl)-2-norbornene, 1,5-cyclooctadiene, bicyclo[2.2.2]octa-2,5-diene, cyclopentadiene, 4,7,8,9-tetrahydroindene and isopropylidenetetrahydroindene.

Mention may be made, as olefinic monomers, of ethylene, butene, hexene and 1-octene. Fluorinated olefinic monomers may also be mentioned.

The process according to the invention can be carried out between 50 and 200° C. and preferably between 100 and 150° C.

The monomer can be different from those of the following group: acrylic acid, methacrylic acid, acrylic acid esters, methacrylic acid esters and acrylonitrile.

The radical polymerization can be thermally initiated, that is to say under the effect of the temperature and in the absence of radical polymerization initiator. The polymerization can also be initiated by a radical polymerization initiator. Some monomers require the use of an initiator, such as acrylates or methacrylates. The monomers requiring the use of an initiator are those commonly regarded by a person skilled in the art as requiring the use of an initiator.

This question regarding the presence or not of an initiator is essentially posed for the beginning of the polymerization. Thus, in the case of the preparation of a block copolymer, this question is posed for the initiation of the polymerization of the first block. This is because, for the preparation of the second block and, if appropriate, of the following one or ones, the polymerization will be carried out by a living polymerization mechanism, without it being necessary to add initiator. However, it is not ruled out to add initiator at the time of addition of a new monomer for the preparation of a new block, if it is desired to accelerate the rate of polymerization.

The polymerization can be carried out under a pressure ranging from 0.1 bar to 3000 bar and preferably from 0.8 to 100 bar. The use of high pressures, for example from 500 to 3000 bar, is recommended in the polymerization of monomers which are gaseous under standard conditions of temperature and of pressure, such as ethylene, alone or in the presence of other monomers.

The polymerization can be carried out in solution, in bulk, in emulsion, in suspension or in a supercritical medium.

The polymerization medium can be intended to result in a high-impact vinylaromatic polymer, such as high-impact polystyrene, in which case the said medium comprises at least one vinylaromatic monomer, which can be styrene, and one rubber, the latter generally being a conjugated polydiene, such as one or more polybutadienes. A high-impact vinylaromatic polymer comprises a vinylaromatic polymer matrix surrounding rubber nodules, it being possible for the said nodules to exhibit varied morphologies, such as droplet, capsule, onion, labyrinth or salami morphologies.

In the examples which follow, the following abbreviations are used:

DEPN: N-tert-butyl-1-diethylphosphono-2,2-dimethylpropyl nitroxide, the expanded formula of which is:

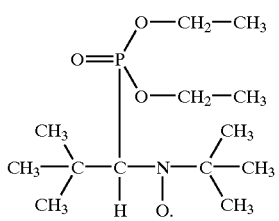

Tempo: 2,2,6,6-tetramethyl-1-piperidinyl-oxy
AIBN: azobis(isobutyronitrile)

DEPN exhibits an equilibrium constant of $7.4 \times 10^{-9}$ mol per liter with respect to styrene in 125° C. This equilibrium constant was measured by the technique described in the doctoral thesis of Didier Benoit, University of Bordeaux I, France, the viva for which was held Oct. 16 , 1997.

Tempo exhibits an equilibrium constant of $1 \times 10^{-11}$ mol per liter with respect to styrene at 125° C.

This equilibrium constant was measured by Fukuda, Macromolecules, 1996, 29, 6393.

EXAMPLE 1

Comparative

Polymerization of styrene in the presence of DEPN, $[F_{SFR} \times (SFR)]/[F_{INI} \times (INI)] = 1$:

AIBN ($9 \times 10^{-5}$ mol), styrene ($3.45 \times 10^{-2}$ mol) and DEPN ($1.8 \times 10^{-4}$ mol) are introduced into a Schlenk tube under nitrogen. The mixture is degassed several times under cold conditions by a vacuum/nitrogen cycle and then brought to 125° C. in an oil bath for several hours. The conversion to polymer is determined by gravimetry: approximately 50 mg of mixture is accurately weighed and then the monomer is evaporated under vacuum, the conversion being determined from the difference in weight due to the evaporation. The samples withdrawn are analysed by Steric Exclusion Chromatography (SEC) with polystyrene standards. The results are combined in the table below.

| Time (h) | Conversation | Experimental Mn (g/mol) | Theoretical Mn (g/mol) | Mw/Mn |
|---|---|---|---|---|
| 0 | 0 | 0 | 0 | — |
| 0.5 | 0.28 | | | |
| 2.5 | 0.76 | 19,200 | 15,200 | 1.1 |

| Time (h) | Conversation | Experimental Mn (g/mol) | Theoretical Mn (g/mol) | Mw/Mn |
|---|---|---|---|---|
| 5 | 0.95 | | | |
| 6 | 0.98 | 25,000 | 19,600 | 1.2 |

EXAMPLE 2

Comparative

Polymerization of styrene in the presence of Tempo, $[F_{SFR} \times (SFR)]/[F_{INI} \times (INI)] = 1$:

The procedure is the same as in Example 1, that DEPN is replaced by the same number of of Tempo. The results are combined in the table below.

| Time (h) | Conversion | Experimental Mn (g/mol) | Theoretical Mn (g/mol) | Mw/Mn |
|---|---|---|---|---|
| 0 | 0 | 0 | 0 | — |
| 0.5 | 0.01 | — | — | |
| 2.5 | 0.02 | — | — | |
| 5 | 0.05 | | | |
| 7 | 0.16 | — | — | |
| 9 | 0.31 | | | |
| 11 | 0.42 | | | |
| 13 | 0.61 | | | |
| 14 | 0.66 | | | |
| 15.5 | 0.75 | | | |
| 18 | 0.81 | | | |
| 20 | 0.80 | | | |
| 23 | 0.86 | 15,900 | 17,200 | 1.2 |
| 26.5 | 0.96 | | | |

EXAMPLE 3

Polymerization of Styrene in the Presence of Tempo and of DEPN

The procedure is the same as in Example 1, except that DEPN is replaced by the same number of moles of a mixture comprising 50 mol % of DEPN and 50 mol % of Tempo. The results are combined in the table below.

| Time (h) | Conversion | Experimental Mn (g/mol) | Theoretical Mn (g/mol) | Mw/Mn |
|---|---|---|---|---|
| 0 | 0 | — | — | — |
| 5 | 0.70 | — | — | — |
| 5.25 | 0.75 | — | — | — |
| 7.25 | 0.98 | 18,300 | 19,600 | 1.2 |
| 9.5 | 0.99 | | | |

The synergy between the two stable free radicals can be confirmed by comparing the experimental conversion after 5 hours with that theoretically expected, taking into account the conversions obtained after 5 hours with each stable free radical taken individually (see Examples 1 and 2).

This synergy can also be observed by measuring the difference in % between the theoretical molecular mass and the experimental molecular mass after polymerizing for 5 hours by the formula:

$$\text{Difference} = \frac{(\text{Experimental Mn} - \text{Theoretical Mn})}{\text{Theoretical Mn}} \times 100$$

These comparisons are made in the table below.

| Stable radicals used | Experimental conversion after polymerizing for 5 h | Conversion calculated by arithmetic mean | Difference between experimental 1 Mn and theoretical Mn (%) |
|---|---|---|---|
| DEPN alone (Example 1) | 0.95 | — | 27 |
| Tempo alone (Example 2) | 0.05 | — | 7.5 |
| 50% DEPN + 50% Tempo (Example 3) | 0.70 | 0.50 [(0.5 × 0.95) + (0.5 × 0.05)] | 7 |

This synergy can also be observed by comparing the productivities (conversion=0.95) obtained in Examples 1 to 3:

| Stable radicals used | Experimental productivity (mg/h) | Productivity calculated by arithmetic mean |
|---|---|---|
| DEPN alone (Example 1) | 684 | — |
| Tempo alone (Example 2) | 130 | — |
| 50% DEPN + 50% Tempo (Example 3) | 487 | 407 [(0.5 × 684) + (0.5 × 130)] |

EXAMPLE 4

Comparative 0.6 g of the polystyrene obtained on conclusion of Example 1 is mixed with 2.4 g of n-butyl acrylate in a Schlenk tube and the solution obtained is degassed via a vacuum/nitrogen cycle. After returning the pressure to a nitrogen atmosphere, the Schlenk tube is placed in an oil bath at 125° C. The conversion of the n-butyl acrylate is monitored by gravimetry. The results are collated in the table below.

| Time (h) | Conversion | Experimental Mn (g/mol) | Theoretical Mn (g/mol) | Mw/Mn |
|---|---|---|---|---|
| 0 | 0 | 25,000 | 25,000 | |
| 3 | 0.22 | | | |
| 5 | 0.30 | | | |
| 5.25 | 0.34 | | | |
| 7.25 | 0.42 | 50,700 | 67,000 | 1.4 |
| 9.25 | 0.54 | | | |

EXAMPLE 5

Comparative

The procedure is the same as in Example 4, except that use is made, at the start, of 0.53 g of the polystyrene of Example 2 and 2.6 g of n-butyl acrylate. The results are combined in the table below.

| Time (h) | Conversion | Experimental Mn (g/mol) | Mw/Mn |
|---|---|---|---|
| 0 | 0 | 17,800 | — |
| 1.13 | 0.08 | — | — |
| 3 | 0.10 | — | — |
| 5 | 0.12 | — | — |
| 7 | 0.19 | — | — |
| 11.5 | 0.20 | — | — |
| 14.5 | 0.26 | — | — |
| 20.75 | 0.23 | — | — |
| 37.6 | 0.32 | 20,500 | 1.3 |

EXAMPLE 6

The procedure is the same as in Example 4, that use is made, at the start, of 1 g of the polystryene of Example 3 and 5.1 g of n-butyl acrylate. The results are combined in the table below.

| Time (h) | Conversion | Experimental Mn (g/mol) | Mw/Mn |
|---|---|---|---|
| 0 | 0 | 20,000 | |
| 3 | 0.39 | | |
| 5 | 0.44 | 31,600 | 1.6 |
| 7 | 0.51 | | |
| 9 | 0.53 | | |
| 11.5 | 0.56 | | |
| 14 | 0.60 | | |
| 17 | 0.62 | 36,800 | 1.4 |
| 19 | 0.65 | | |
| 21 | 0.65 | | |
| 23 | 0.69 | | |

It is found that, after 5 hours, the conversion of the n-butyl acrylate is greater than that observed for the same test time in the case of Examples 4 and 5.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/12477, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the polymerization of at least one monomer which can be polymerized by the radical route in the presence of at least two different stable free radicals having different equilibrium constants whereby a synergism of productivity is realized and wherein the equilibrium constants of the stable free radicals with respect to the monomer exhibit a ratio of greater than 5.

2. A process according to claim 1, characterized in that the ratio is greater than 10.

3. A process according to claim 2, characterized in that the ratio is greater than 100.

4. A process according to claim 1, characterized in that at least two of the stable free radicals are such that:

the first exhibits, in its structure, the linkage

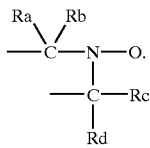

in which the Ra, Rb, Rc and Rd radicals, which can be identical or different, are either a hydrogen atom or a methyl radical, the second exhibits, in its structure, the linkage

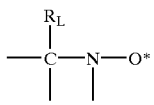

in which $R_L$ represents a monovalent radical with a molar mass of greater than 15.

5. A process according to claim 4, characterized in that $R_L$ exhibits a molar mass of greater than 30.

6. A process according to claim 5, characterized in that $R_L$ exhibits a molar mass ranging from 40 to 400.

7. A process according to claim 1, characterized in that one of the two stable free radicals is
2,2,6,6-tetramethyl-1-piperidinyloxy,
4-hydroxy-2,2,6,6-tetramethyl-1-piperidinyloxy,
4-methoxy-2,2,6,6-tetramethyl-1-piperidinyloxy,
4-oxo-2,2,6,6-tetramethyl-1-piperidinyloxy,
bis(1-oxyl-2,2,6,6-tetramethylpiperidin-4-yl)sebacate,
2,2,6,6-tetramethyl-4-hydroxypiperidin-1-oxyl monophosphonate, or
3-carboxy-2,2,5,5-tetramethylpyrrolidinyloxy, and the other of the two stable free radicals is
N-tert-butyl-1-diethylphosphono-2,2-dimethylpropyl nitroxide,
N-tert-butyl-1-dibenzylphosphono-2,2-dimethylpropyl nitroxide,
N-tert-butyl-1-di(2,2,2-trifluoroethyl)phosphono-2,2-dimethylpropyl nitroxide,
N-tert-butyl-1-diethylphosphono-2-methylpropyl nitroxide,
N-(1-methylethyl)-1-(diethylphosphono)cyclohexyl nitroxide, or
N-(1-phenylbenzyl)-1-diethylphosphono-1-methylethyl nitroxide.

8. A process according to claim 1, characterized in that $$\sum_{i=1}^{t} [F_{SFR}^i \times (SFR^i)]$$

ranges from $5\times10^{-7}$ to 0.5 mol per mole of monomer, $F_{SFR}^i$ representing the functionality of the ith stable free radical $SFR^i$, t representing the number of stable free radicals in the polymerization medium and $(SFR^i)$ representing the number of moles of the ith stable free radical.

9. A process according to claim 8, characterized in that $$\sum_{i=1}^{t} [F_{SFR}^i \times (SFR^i)]$$

ranges from $5\times10^{-6}$ to 0.5 mol per mole of monomer.

10. A process according to claim 1, characterized in that at least two stable free radicals are present in amounts such that the ratio $$\frac{F_{SFR}^1 \times (SFR^1)}{F_{SFR}^2 \times (SFR^2)}$$

ranges from 0.001 to 1000, in which $F_{SFR}^1$ represents the functionality of a first stable free radical $SFR^1$, $(SFR^1)$ represents the number of moles of the said first stable free radical, $F_{SFR}^2$ represents the functionality of a second stable free radical $SFR^2$, $(SFR^2)$ represents the number of moles of the said second stable free radical.

11. A process according to claim 10, characterized in that $$\frac{F_{SFR}^1 \times (SFR^1)}{F_{SFR}^2 \times (SFR^2)}$$

ranges from 0.01 to 100.

12. A process according to claim 1, characterized in that at least one radical polymerization initiator is introduced into the polymerization medium in an amount such that $F_{INI}\times(INI)$ ranges from $1\times10^{-5}$ to 0.1 mol per mole of monomer, $F_{INI}$ representing the functionality of the initiator and (INI) representing the number of moles of initiator.

13. A process according to claim 12, characterized in that $F_{INI}\times(INI)$ ranges from $1\times10^{-4}$ to 0.1 mol per mole of monomer.

14. A process according to claim 1, characterized in that it is carried out between 100 and 150° C.

15. A process according to claim 1, characterized in that several monomers are introduced successively, so as to result in a block copolymer.

16. A process according to claim 1, characterized in that the conversion of monomer to polymer is greater than 0.5.

17. A process according to claim 1, characterized in that the presence of the two stable free radicals results in a synergy during the polymerization.

18. A process according to claim 1, characterized in that at least one monomer is chosen from the group consisting of vinyl, vinylidene, diene, olefinic and allylic monomers.

19. A process according to claim 13, characterized in that at least one monomer is a vinylaromatic monomer.

20. A process according to claim 19, characterized in that at least one monomer is styrene.

21. A process according to claim 19, characterized in that it results in a high-impact vinylaromatic polymer comprising a vinylaromatic polymer matrix and rubber nodules.

22. A process according to claim 21, characterized in that at least one monomer is acrylate or methacrylate.

23. A process according to claim 1, characterized in that the monomer is different from those of the following group: acrylic acid, methacrylic acid, acrylic acid esters, methacrylic acid esters and acrylonitrile.

24. A process according to claim 1, wherein the at least two different stable free radicals having different equilibrium constants are: N-tert-butyl-1-diethylphosphono-2,2-dimethylpropyl nitroxide and 2,2,6,6-tetramethyl-1-piperidinyl-oxy.

25. A process according to claim 24, wherein said at least one monomer is styrene.

* * * * *

UNITED STATES PATENT AND TRADEMARK OFFICE
CERTIFICATE OF CORRECTION

PATENT NO.   : 6,509,428 B1                                                              Page 1 of 1
DATED         : January 21, 2003
INVENTOR(S)  : Thierry Senninger et al.

It is certified that error appears in the above-identified patent and that said Letters Patent is hereby corrected as shown below:

Column 17,
Line 58, reads "[$F^i_{SFR}$," should read -- [$F_{SFR}^i$ --

Column 18,
Line 4, reads "[$F^i SFR$," should read -- [$F_{SFR}^i$ --
Lines 13 and 32, "$F^1_{SFR}$," should read -- $F_{SFR}^1$ --
Lines 14 and 33, "$F^2_{SFR}$," should read -- $F_{SFR}^2$ --

Signed and Sealed this

Fifteenth Day of June, 2004

JON W. DUDAS
*Acting Director of the United States Patent and Trademark Office*